United States Patent

Bauer

[11] 3,935,809
[45] Feb. 3, 1976

[54] GRILLING APPARATUS USABLE AS A SPACE HEATING MEANS

[75] Inventor: Hans Bauer, Dettingen, Germany

[73] Assignee: Dietz-Druckguss KG, Unterensingen, Germany

[22] Filed: July 22, 1974

[21] Appl. No.: 490,481

[30] Foreign Application Priority Data
Aug. 1, 1973 Germany............... 7328066[U]

[52] U.S. Cl.................. 99/447; 99/450; 126/25 R
[51] Int. Cl.²......................................... A47J 27/66
[58] Field of Search................... 99/446, 447, 450; 126/3–4, 25, 29, 92, 261, 268; 219/201, 340, 416, 454, 472–473, 474, 553

[56] References Cited
UNITED STATES PATENTS

| | | | |
|---|---|---|---|
| 2,025,899 | 12/1935 | Rhodes | 219/472 X |
| 2,247,974 | 7/1941 | Thimblethorpe | 219/474 |
| 2,422,450 | 6/1947 | Van Daam | 219/474 |
| 2,746,377 | 5/1956 | Parks | 126/25 R X |
| 2,841,133 | 7/1958 | Schwank | 126/92 B |
| 2,893,375 | 7/1959 | Emmons | 126/25 R X |
| 3,085,562 | 4/1963 | Persinger et al. | 126/25 R |
| 3,343,527 | 9/1967 | Manteris | 126/25 R |

Primary Examiner—Edward L. Roberts
Assistant Examiner—Arthur O. Henderson

[57] ABSTRACT

Grilling apparatus with a heating arrangement, a grilling tub or housing with a dripping pan, and a hood which can be used to cover the grilling tub. The heating arrangement has a vertically arranged heating plane, the grilling tub opens towards the front, and is closed by a swingable front wall. The swingable front wall is selectively held in vertical and horizontal positions, and is removable from the grilling tub. The hood is swingably connected with the grilling tub so that in an open position of the hood, and with the front wall opened, the heat created by the heating element is projected out of the grilling tub towards the front, so that the apparatus then functions as a space heater.

3 Claims, 3 Drawing Figures

GRILLING APPARATUS USABLE AS A SPACE HEATING MEANS

This invention relates to a grilling apparatus with a grilling tub or housing, including a heating arrangement, a dripping bowl and a covering hood, for grilling and baking of food as for example, sausages, chickens, toasted sandwiches, etc. For this purpose, the grilling apparatus is provided with a heating arrangement, preferably with an infrared gas-emitter which is fed by a gas containing bottle.

Known grilling apparatus consist of a grill tub which opens towards the top and which is covered by the grill grate. This covering grill grate has to be removed for cleaning the grilling tub.

The heat created by the heating arrangement rises to the top, warms the food to be grilled, but then is wasted by escaping into the open. The use of such grilling apparatus is mainly for the outdoors, as for example, in the garden, on balconies or terraces. In cool climates, with often changeable weather conditions, it has been found that such grilling apparatuses have to be used with further heating elements to heat the surroundings.

It is an object of the instant invention of a grilling apparatus to provide an optimal use of the heat of the heating arrangement, and to change the grilling apparatus with little manipulation into a space heater for heating the surroundings.

This object is achieved by the grilling apparatus of the present invention in that the heating arrangement has a vertical heating plane, and the grilling tub, which is open towards the front, is closed by a swingable front wall.

The swingable front wall, which is secured to the sidewalls of the grilling tub, can be used as a storage tray when it is in an upward lifted position; in this position the dripping pan can easily be removed from the grilling tub so that the dripping pan and grilling tub can easily be cleaned.

In an advantageous design of this invention, the dripping pan is connected with a reflector-plane arranged opposite the vertical heating plane, thereby reflecting the infrared rays from the heating plane towards the grilling location.

Furthermore, the grilling tub is connected with a swingable hood, which, in its closed position, completely covers the grilling tub, so that the whole grilling apparatus forms a closed housing. The hood can be brought into different adjusted positions relative to the grilling tub, so that the heat rising in front and back of the heating arrangement is diverted from the hood towards the grilling location and also warms the same from the top.

When the grilling apparatus, after grilling is finished, is to be used as a space heater, the front wall is completely removed and the hood is swingably moved into a desired position. The heat produced by the vertical heating plane is now being projected directly to the front of the grilling apparatus on the one hand; on the other hand, the inside of the hood serves as a reflector plane which also reflects the heat towards the front. There is thus provided a heating apparatus that makes it possible to remain on a terrace or balcony, for example, after the completion of the grilling, even in cool weather.

A descriptive example of the invention is shown in the drawings and is hereinbelow described in detail. In the drawings.

Figure 1:
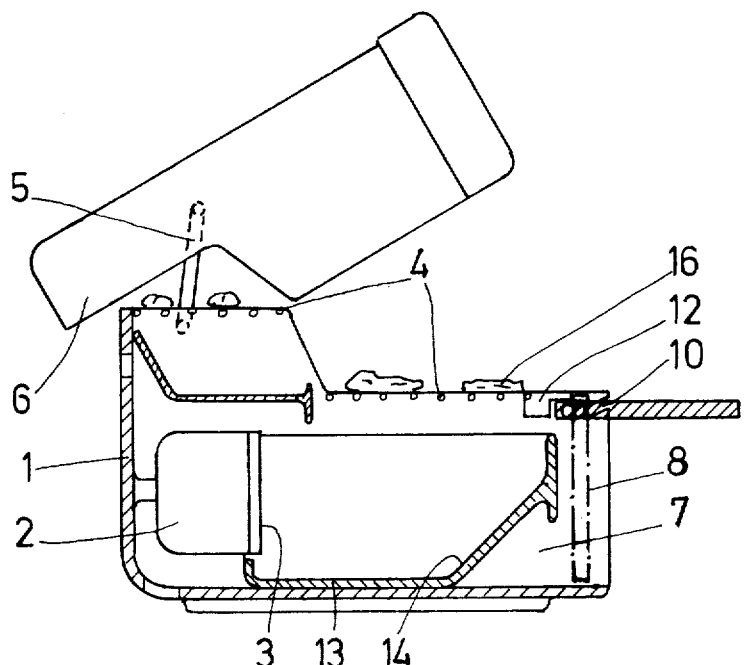
FIG. 1 is a view in vertical cross-section of the whole grilling apparatus provided with a front wall.
Figure 2:
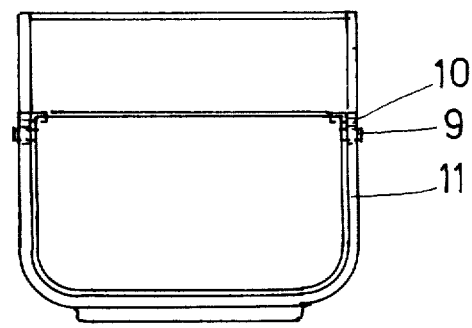
FIG. 2 is a view in front elevation of the grilling apparatus with the tub and the hood removed therefrom.
Figure 3:
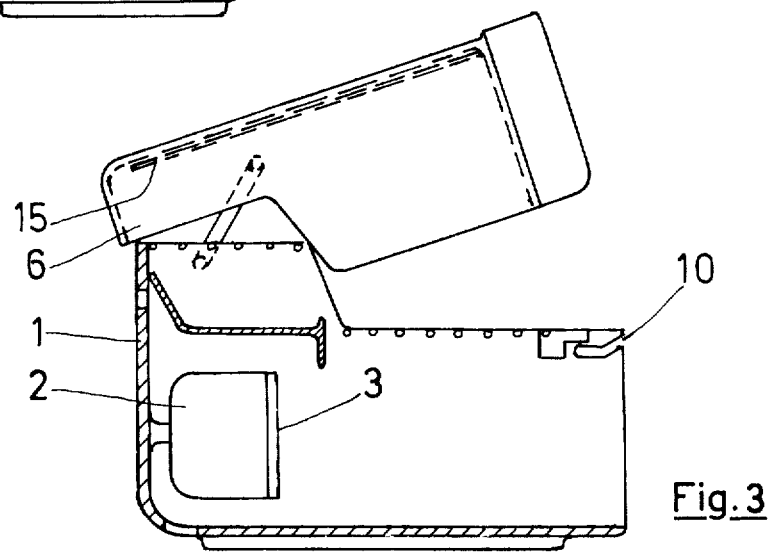
FIG. 3 is a view in vertical cross-section of the whole grilling apparatus with the dripping pan and front wall removed.

In a tray-shaped grilling tub or housing 1 open towards the front and top, there is a heating arrangement 2 with a fixed vertically arranged heating plane 3. The upper side of the grilling tub is covered by grates 4. By means of pivotally mounted brackets 5 a hood 6 opposite the grilling tub 1 can be adjusted so that the grilling tub 1 is either fully covered by the hood 6 or is disposed above it in several different positions of which one is shown in FIGS. 1 and 3.

The front of the inner space 7 of the grilling tub 1 is closed by a swingable front wall 8 which can also be removed. This front wall 8 has two lateral pins 9, which fit into opposed angular slots 10 in the side walls 11. When the grilling apparatus is not in use, the front wall 8, as shown in FIG. 1 by dot-dash lines, is disposed in a vertical position and completely closes the inner space 7.

The side walls 11, above the slots 10, have inwardly facing supporting abutment elements 12. The slits 10 make it possible to swing the front wall 8 90° into a horizontal position, and then to move it in the direction of the supporting elements 12 so that the rear edge of wall 8 lies beneath the elements 12, whereby the front wall 8 is stably held in a horizontal position as shown in FIG. 1.

A removable dripping pan 13 is slid into the inner space 7, pan 13 having a reflector plane 14 facing towards the grate 4. A further reflector wall 15 can be arranged at an inner wall of the hood 6.

The foods 16 to be grilled or baked are put onto the grates 4 and are warmed by the heating arrangement 2, which is preferably formed of infrared gas emitters. On the one hand, this is done by radiation, that is, through rays, which directly reach the underside of the foods 16 from the heating plane 3 or indirectly by way of the reflector planes 14. On the other hand, the food is heated by convection, that is, by heat rising from the heating arrangement 2 which is transferred by the hood 6, and which reaches the foods 16 from the top.

During grilling the front wall 8 is usually positioned horizontally and serves to store the food, flatware, dishes, etc.

After the grilling procedure is finished, the dripping pan 13 can easily be removed forwardly from the grilling tub 1 and can be cleaned and replaced.

Should the grilling apparatus be used and changed into a space heating apparatus to heat the surroundings, front wall 8 will be removed from the tub through the open front ends of slots 10; dripping pan 13 will also be removed as shown in FIG. 3. Hood 6 will be brought into a slightly opened position, so that the heat rays, projected by the heating plane 3, can exit directly through the front. The rays projected in the direction of hood 6 are, through reflector planes 15, transferred as also to be projected towards the front.

Although the invention is illustrated and described with reference to a single preferred embodiment thereof, it is to be understood that it is in no way limited to the disclosure of such a single preferred embodiment, but is capable of numerous modifications within the scope of the appended claims.

What is claimed is:

1. A grilling apparatus comprising, in combination, a grilling tub having an upper grilling portion and a selectably openable front wall, a hood coupled to the tub and adjustable from a closed position to a desired open position above the grilling portion, heating means disposed in the tub and having a vertically arranged heating plane for radiating heat forwardly toward the first wall of the tub, and means removably insertable into the tub through the front wall for deflecting the forwardly radiated heat upwardly toward the grilling portion.

2. A grilling apparatus in accordance with claim 1, wherein the front wall is removably connected with the grilling tub for swinging movement between a vertical tub-closing position and a horizontal tub-opening position, and wherein the grilling tub has opposed side walls, the side walls of the grilling tub having opposed aligned slots, pins connected to the front wall fitting within the respective slots, and supporting elements connected with the side walls which serve selectively to hold the swingable front wall in a horizontal position.

3. A grilling apparatus as defined in claim 1, in which the hood has a reflecting surface adapted to deflect heat, upwardly incident thereon, in a generally forward direction when the hood is adjusted to an open position.

* * * * *

UNITED STATES PATENT AND TRADEMARK OFFICE
CERTIFICATE OF CORRECTION

PATENT NO. : 3,935,809
DATED : February 3, 1976
INVENTOR(S) : Hans BAUER

It is certified that error appears in the above–identified patent and that said Letters Patent are hereby corrected as shown below:

On the title page at [73] delete

"Fa. Dietz-Druekguss KG,
Unterensingen, Germany"

and insert therefor

--Hans Bauer; Dettingen, and
Dietz-Druckguss KG;
Unterensingen, both of Germany--.

Signed and Sealed this

Twelfth Day of October 1976

[SEAL]

Attest:

RUTH C. MASON
*Attesting Officer*

C. MARSHALL DANN
*Commissioner of Patents and Trademarks*